April 1, 1941.   R. T. CORNELIUS   2,236,620
FAUCET
Filed April 17, 1939

Inventor
Richard T. Cornelius
By Caswell & Lagaard
Attorneys

Patented Apr. 1, 1941

2,236,620

UNITED STATES PATENT OFFICE 2,236,620

FAUCET

Richard T. Cornelius, Minneapolis, Minn.

Application April 17, 1939, Serial No. 268,276

9 Claims. (Cl. 251—132)

My invention relates to faucets and particularly to faucets adapted to dispense liquids such' as beer and carbonated beverages.

An object of the invention resides in providing a faucet in which the liquid leaves the faucet as a smooth continuous stream of uniform cylindrical cross section.

Another object of the invention resides in providing a faucet in which a relatively large stream of liquid may be procured.

Another object of the invention resides in providing a faucet in which the air is quickly vented and the liquid is quickly drained when the faucet is shut off.

Another object of the invention resides in providing a faucet which is extremely small and compact.

A still further object of the invention resides in providing a faucet which is easily operated.

A feature of the invention resides in providing a faucet which can be easily taken apart for cleaning, inspection and repair.

A still further object of the invention resides in providing a faucet in which leakage is prevented.

Another object of the invention resides in providing a faucet having a diaphragm and in constructing the faucet so that the pressure on the diaphragm is substantially equal to that on the valve head whereby a small amount of effort is required to open the faucet.

Another object of the invention resides in providing a faucet which is so constructed as to minimize heating of the beer when passing through the faucet due to the ambient temperature.

An object of the invention resides in providing a faucet in which the valve stem is guided by a member disposed in close proximity to the valve seat.

A feature of the invention resides in providing a faucet having a transparent nozzle whereby the condition of the liquid within the nozzle may be viewed.

Other objects of the invention reside in the novel combination and arrangement of parts and in the details of construction hereinafter illustrated and/or described.

Figure 1:
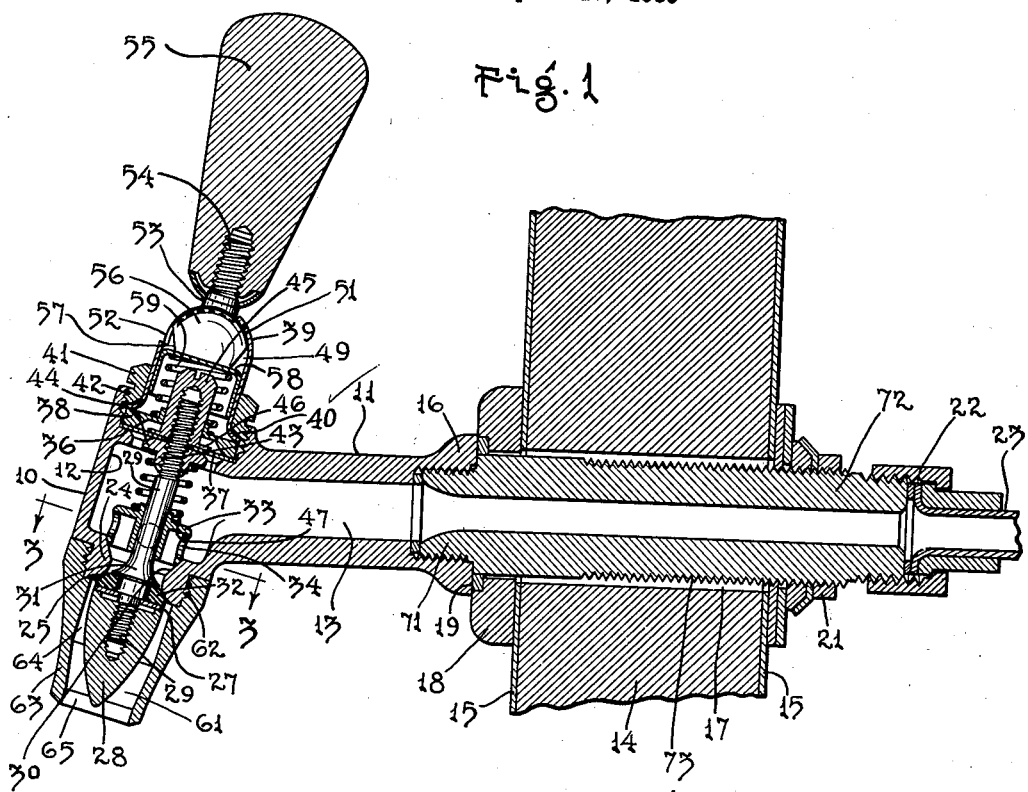
Fig. 1 is an elevational sectional view of a faucet illustrating an embodiment of my invention.

In the dispensing of beverages such as beer and the like, it is highly desirable to procure a uniform stream of ample capacity and of solid cylindrical shape. At the same time it is highly desirable to cause the faucet to shut off quickly and to prevent dripping after the faucet is shut off. Furthermore it is desirable to produce a faucet which is not appreciably affected by the ambient temperature. The present invention provides a construction by means of which these desirable characteristics are obtained.

My improved faucet comprises a body 10, tubular in form, which is provided at one side with a neck 11 extending therefrom. The body 10 has a vertical passageway 12 within the same and the neck 11 has a passageway 13 extending through it which communicates with the passageway 12.

The faucet preferably is attached to a wall or some similar structure and for the purpose of illustration, a portion of a cooling cabinet 14 has been shown which is covered with facings 15 upon the exterior and interior thereof constructed of sheets of metal. In order to attach the faucet to the wall 14, the neck 11 is constructed with an enlarged portion 16 internally threaded to receive the threaded end 71 of a nipple 72. Nipple 72 extends through a hole 17 in the wall 14 and the facings 15. A collar 18 mounted on the nipple 72 is seated against a shoulder 19 formed by the enlarged portion 16 and abuts against the outer facing 15 of wall 14. A nut 21, screwed upon threads 73 on the other end of nipple 72 and disposed upon the interior wall 14 holds the neck attached to said wall. A tube connection 22 is provided at the end of the nipple 72 and connects a tube 23 to said nipple. Tube 23 leads to the source of the liquid to be dispensed and where beer is to be dispensed said tube is usually connected to the cooling coil or forms a part thereof.

Figure 2:
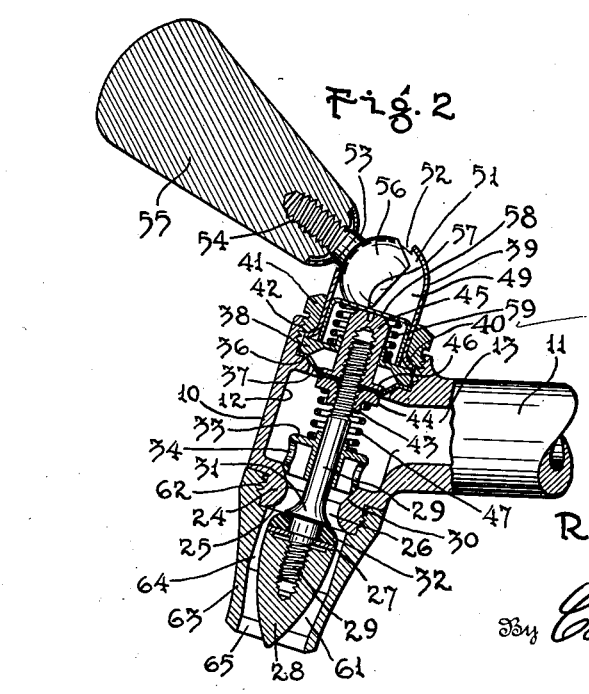
Fig. 2 is a view similar to Fig. 1 of a portion of the structure shown therein and disclosing the parts in altered position.
Figure 3:
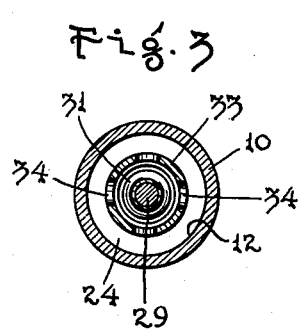
Fig. 3 is a sectional view taken on line 3—3 of Fig. 1.

The lower portion of the body 10 of the faucet is constructed with a constriction 24 which is semi-circular in cross section as best shown in Figs. 1 and 2. By means of this construction a valve seat 25 is formed which faces downwardly. The bore 12 communicates with a passageway 26 which is encircled by the constriction 24 and the valve seat 25 and which is adapted to be closed by means of a valve head 27. The valve head 27 is provided with a conical tip 28 which is threaded to receive a valve stem 29. Formed upon the stem 29 is a collar 31 which clamps a sealing ring 32 in position at the upper end of the tip 28. The ring 32 is adapted to engage the seat 25 and, when the valve head 27 is moved upwardly, closes the passageway 26.

The valve stem 29 is guided for axial movement along the bore 12 by means of a cup-shaped guide 33. This guide is concentrically disposed within the bore 12 and is seated at its end against a conical shoulder 30 formed on the upper surface of the constriction 24. Openings 34 in said guide bring the bore 12 in body 10 in communication with the passageway 26. The guide 33 is constructed with a sleeve 35 which forms a guide for guiding the valve stem 29 for sliding reciprocating movement to move the valve head 27 into opening and closing position.

Within the interior of the body 10 and above the passageway 13 is formed an inwardly extending shoulder 36. Extending across this shoulder is a diaphragm 37 which is held in position upon said shoulder by means of a clamp disc 38. A tubular housing 39 set into the upper end of the body 10 and has an outwardly extending portion 40 which engages the clamp disc 38. This housing is held attached to the body 10 by means of a clamp nut 41 which is annular in form and which is threaded to screw into threads 42 formed in the upper end of the body 10. This nut serves to hold the housing 39 in position as well as to clamp the diaphragm 37 in place.

The valve stem 29 extends through the diaphragm 37 which is attached thereto in the following manner: The upper end of the valve stem 29 is threaded to receive a collar 43. The collar 43 has a flange 44 which bears against the underside of the said diaphragm. In conjunction with the valve stem 29, a plunger 45 is employed which is threaded to screw upon the end of the stem 29. This plunger is constructed with a flange 46 which bears upon the upper side of the diaphragm 37. When the plunger 45 is screwed down toward the collar 43, a tight connection is procured between the valve stem 29 and the diaphragm so that the passageway 12 is completely closed off from the exterior excepting through the passageway 26.

The valve stem 29 is urged upwardly through a compression coil spring 47 which encircles the said valve stem and which is disposed within the passageway 12. This spring is seated against the flange 44 of collar 43 and against the top of the guide 33. Spring 47 is of such dimensions and the diaphragm 37 is so situated with respect to the spindle 29 that the said spring 47 may urge the ring 32 into engagement with the seat 25 of the body 10.

The housing 39 is constructed with a bore 49 which terminates at its upper end in a spherical socket 51. A slot 52 is cut in the housing 39 and communicates with the socket 51. For operating the valve, a lever 53 is utilized which includes a threaded shank 54 screwed into a knob or handle 55. The shank 54 extends through the slot 52 and has attached to the inner end thereof a ball-head 56 which is seated in the socket 51. The head 56 is constructed with a cam 57, which is adapted to engage a hollow cross-head 58 slidably mounted within the bore 49 of housing 39. This cross-head is adapted to engage the upper end of the plunger 45, and as the knob 54 is moved forwardly, forces the plunger down and opens the passageway 26. The cross-head 53 is normally urged upwardly to move the lever 53 to normal position as shown in Fig. 1 by means of a compression coil spring 59. This coil spring encircles the plunger 45 and is seated at one end against the cross-head 58 and at its other end against the clamp disc 38. Spring 59 operates independently of spring 47 to always maintain the lever 53 in normal position when the faucet is in disuse. In the construction of the faucet play is left between the cross-head 58 and plunger 45, as indicated in Fig. 1, so that a certain amount of lost motion of the lever 53 occurs before the plunger 45 is depressed and the passageway 26 opened. This compensates for compression and wear of the sealing ring 32 so that the faucet may at all times be completely closed.

At the lower end of the body 10 the same is threaded as indicated at 62 to receive a spout 63. This spout 63 is constructed from some transparent heat insulating material such as one of the phenal formaldehyde products and serves to prevent absorption of heat and the subsequent heating of the beverage or other liquids passing through the faucet. The spout 63 is formed with a bore 64 which conforms somewhat to the shape of the tip 28 of valve head 27 whereby an annular passageway 61 of fairly uniform cross sectional area throughout its extent is procured. The tip 28 is substantially co-extensive with the spout 63. At the lower end of said spout the same is formed with an outlet 65 which is cylindrical in form. By means of this arrangement of parts, the liquid passing into the chamber 34 from the passageway 13 flows without agitation through the passageways of the valve and leaves the outlet 65 in a solid cylindrical stream of ample dimensions.

For the prevention of heat transfer to the body 10 and neck 11, collar 18 is constructed of insulating material and the knob 55 may also be constructed of the same material.

The operation of the invention is as follows: When the faucet is in normal position the parts are arranged as in Fig. 1. It will be noted in Fig. 1 that spring 47 urges the valve head 27 upwardly to cause the sealing ring 32 to engage valve seat 25 and to close the passageway 26 through the faucet. Due to the relative sizes of the diaphragm 37 and the valve head 27, the downward pressure on the valve head and the upward pressure on the diaphragm are practically equalized so that the valve head is held seated against the seat 25 by only a small amount of pressure which is exerted by spring 47. At the same time spring 59 urges the cross-head 58 into engagement with the cam 57 of lever 53 and maintains said lever upright as indicated. When so disposed the shank 54 of said lever is at the uppermost portion of the slot 52. When the lever 53 is swung forwardly through engagement with the knob 55 and into the position shown in Fig. 2 the cross-head 58 is depressed. Normally the said cross-head is spaced from the plunger 45, but after the cross-head has been moved a short distance, engages said plunger and moves the same downwardly. As the plunger 45 moves downwardly, valve head 27 is unseated from seat 25 and the passageway 26 opened. As will be noted, the passageway 26 is of large proportions compared with the length of travel of the valve head. This procures almost instant opening of the valve passageway so that a full size stream is quickly procured. By the relation of the spout 63 to the tip 28 the passageway 61 gradually converges and changes from annular to cylindrical form so that the liquid, on leaving the faucet, is in a cylindrical stream. It will be noted that the entire portion of the faucet, from the valve seat to the end of the spout, is extremely short and that all of the surfaces of the spout and the valve head beyond the seat extend in a downward direction. By means of this construction, the liquid flowing from the spout is rapidly drained out and the spout easily vented after the faucet is closed.

The advantages of my invention are manifest. With my improved faucet heating of the beverage or liquid passing through the same is greatly reduced. With my improved faucet a large volume of liquid can be dispensed which flows from the spout as a smooth regular stream of cylindrical cross section. The faucet is easily operated and with a minimum amount of effort due to the balancing of the pressure on the diaphragm and the valve head. By means of the arrangement of the parts an extremely compact construction is provided which can be manufactured at a nominal expense. Due to the lost motion employed and the separate springs utilized with the invention, the operating lever is always brought back to its original position and wear of the valve head sealing member is compensated for.

Changes in the specific form of my invention, as herein disclosed, may be made within the scope of what is claimed without departing from the spirit of my invention.

Having described my invention, what I claim as new and desire to protect by Letters Patent is:

1. In a faucet, a tubular body, a shoulder at one end of said body, a seat at the other end of the body, means forming an inlet to said body between the shoulder and seat, a second shoulder adjacent said seat, a cup-shaped guide disposed within said body and seated on said second shoulder, a valve stem guided for movement along said guide, a diaphragm overlying said first named shoulder and secured to said valve stem, a clamping disc overlying said diaphragm, a tubular housing extending outwardly of said body and having an outwardly extending portion engaging said clamping disc, a valve head on said valve stem, means for simultaneously urging said outwardly extending portion, disc and diaphragm together and toward said shoulder, a spring disposed about said valve stem and engaging said cup-shaped guide and a part movable with said valve stem and urging said valve stem to move in a direction to bring said valve head into engagement with said valve seat and means disposed within said housing for operating said valve stem.

2. In a faucet, a tubular body, a shoulder at one end of said body, a seat at the other end of the body, means forming an inlet to said body between the shoulder and seat, a second shoulder adjacent said seat, said second shoulder being conical and converging away from said first named shoulder, a cup-shaped guide disposed within said body and seated at its open end against said second shoulder, a valve stem guided for movement along said guide, a diaphragm overlying said first named shoulder and secured to said valve stem, a clamping disc overlying said diaphragm, means for urging said clamping disc toward said first named shoulder to clamp the diaphragm therebetween, said disc having a bore therein, a plunger on said valve stem guided in said bore for reciprocation, a valve head on said valve stem, and a spring encircling said valve stem and engaging said cupshaped guide and a part movable with said valve stem for holding said guide seated against said conical shoulder and for urging the valve head against the valve seat.

3. In a faucet, a tubular body open at the lower end, said body having a constriction at its lower end forming a seat, a cup-shaped guide concentrically disposed within said body and forming in conjunction therewith an annular passageway, an inlet communicating with said annular passageway, a valve stem guided for axial movement along said guide, a valve head attached to said stem and adapted to engage said seat, a collar on said valve stem, a spring disposed about said valve stem and seated against said guide and collar for urging said valve head into engagement with said seat, a diaphragm encircling said valve stem and fixed at its margin relative to said body, a plunger secured to said stem and clamping said diaphragm against said collar and means for engaging said plunger to reciprocate the same to procure operation of said valve head.

4. In a faucet, a tubular body, an annular shoulder at one end of the body, an annular seat in said body, means forming an inlet to said body between the shoulder and seat, a diaphragm overlying said shoulder, a clamping disc for clamping said diaphragm against the shoulder, said clamping disc forming a guide, a valve stem attached to said diaphragm and having a part guided for movement in said guide, a valve head on said valve stem adapted to seat against said seat, a coil spring on said valve stem for urging said valve head against said seat, a cross-head movable axially relative to said valve stem and adapted to engage the end of said plunger, cam means for reciprocating said crosshead and a second spring acting against said crosshead for urging said crosshead into engagement with said cam means and for retaining the cam means in various positions.

5. In a faucet, a tubular body, an annular shoulder at one end of the body, an annular seat in said body, means forming an inlet to said body between the shoulder and seat, a diaphragm overlying said shoulder, a clamping disc for clamping said diaphragm against the shoulder, said clamping disc forming a guide, a valve stem attached to said diaphragm and having a part guided for movement in said guide, a valve head on said valve stem adapted to seat against said seat, a coil spring on said valve stem for urging said valve head against said seat, a crosshead movable axially relative to said valve stem and adapted to engage the end of said plunger, cam means for reciprocating said crosshead and a second spring on said valve stem acting against said crosshead and clamping disc for urging said crosshead into engagement with said cam means and for retaining the cam means in various positions, said crosshead falling short of said plunger when the valve head is in seating position to allow for variations in compression of the valve head.

6. In a tubular body, means forming an inlet to said body intermediate the ends thereof, an annular constriction within said body formed on one side with a valve seat and on the other side with a conical shoulder concentric therewith, a valve stem concentrically disosed within said tubular body and extending through said constriction, a valve head on one end of said valve stem adapted to seat against said valve seat, means at the other end of said valve stem for guiding said valve stem for reciprocating movement and other guide means in proximity to said valve seat for further guiding said valve stem for reciprocating movement, said last named guide means movably engaging said conical shoulder and being adapted to be centered by said conical shoulder to bring said valve head into concentric relationship with respect to said valve seat.

7. In a faucet, a tubular body, a valve stem, means for guiding said valve stem for reciprocable movement within said body, means forming a valve seat, a valve head carried by said stem and adapted to engage said seat, resilient means acting between said valve stem and a part fixed relative to said body for urging said valve head into engagement with said seat, means fixed relative to said body and forming a bore concentric with the axis of said valve stem, said bore having a spherical socket at the end thereof and a slot communicating therewith and extending along a great circle thereof, a lever having a shank extending through said slot and guided for movement thereby and a ball-head seated in said socket, a cam formed on said head, a cross-head slidable within said bore, resilient means for urging said cross-head into engagement with said cam to urge said lever into normal position, and means movable with said valve stem for engagement with said cross-head to procure unseating of the valve upon movement of the lever in one direction.

8. In a faucet, a tubular body, a valve stem, means for guiding said valve stem for reciprocable movement within said body, means forming a valve seat, a valve head carried by said stem and adapted to engage said seat, resilient means acting between said valve stem and a part fixed relative to said body for urging said valve head into engagement with said seat, means fixed relative to said body and forming a bore concentric with the axis of said valve stem, said bore having a spherical socket at the end thereof and a slot communicating therewith and extending along a great circle thereof, a lever having a shank extending through said slot and guided for movement thereby, and a ball-head seated in said socket, a cam formed on said head, a cross-head slidable within said bore, resilient means for urging said cross-head into engagement with said cam to urge said lever into normal position, and a plunger attached to said stem and adapted to be engaged by said cross-head and operating to unseat said valve head from said seat upon movement of said lever in one direction.

9. In a faucet, a tubular body, a valve stem, means for guiding said valve stem for reciprocable movement within said body, means forming a valve seat, a valve head carried by said stem and adapted to engage said seat, resilient means acting between said valve stem and a part fixed relative to said body for urging said valve head into engagement with said seat, means fixed relative to said body and forming a bore concentric with the axis of said valve stem, said bore having a socket at the end thereof and an opening therethrough communicating therewith, a lever having a shank extending through said opening and a head seated in said socket, said head having two cam surfaces intersecting one another in angular relation, means slidable with said valve stem for engaging said cam surfaces, one of said cam surfaces serving to hold the valve head in open position and the other holding the lever in normal position when the valve head is closed.

RICHARD T. CORNELIUS.